July 30, 1946.    H. BANY ET AL    2,405,007
CONTROL SYSTEM
Filed Jan. 20, 1945
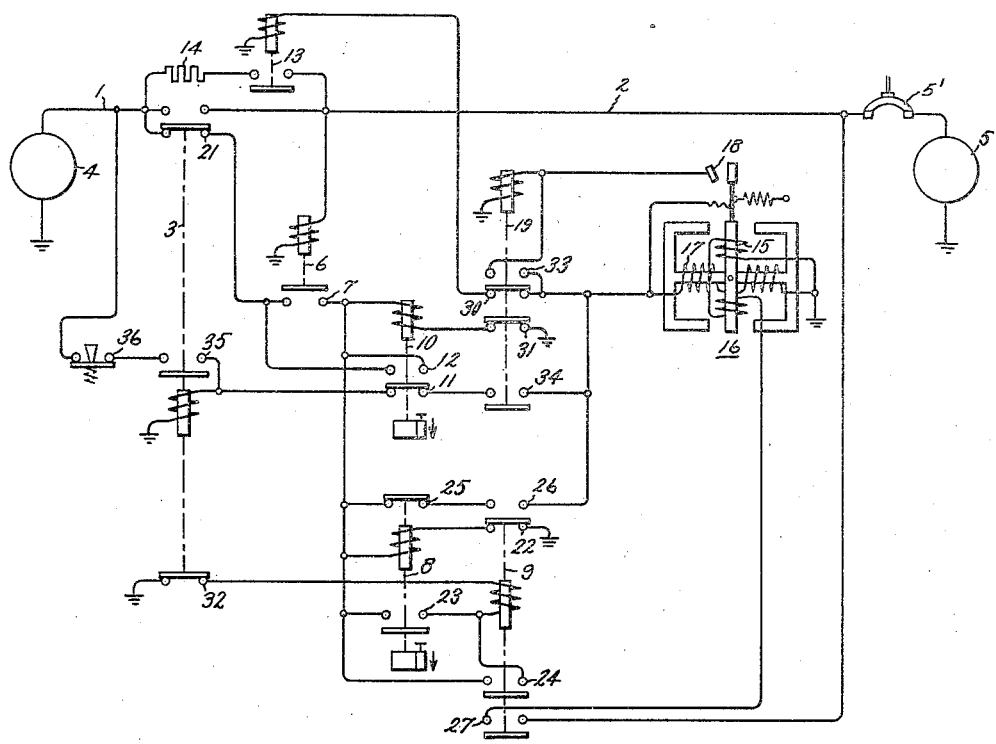
Inventors:
Herman Bany,
Amos W. Bateman,
by Harry E. Dunham
Their Attorney.

Patented July 30, 1946

2,405,007

UNITED STATES PATENT OFFICE 2,405,007

CONTROL SYSTEM

Herman Bany, Lansdowne, and Amos W. Bateman, Yeadon, Pa., assignors to General Electric Company, a corporation of New York Application January 20, 1945, Serial No. 573,706

7 Claims. (Cl. 171—118)

Our invention relates to a control system and particularly to a system for controlling the connection between two normally energized disconnected circuits so that the two circuits are connected together when one of the circuits becomes deenergized.

One object of our invention is to provide an improved arrangement of apparatus for effecting, when one of two normally energized disconnected circuits become deenergized, the direct connection of the deenergized circuit to the energized circuit only in case the load impedance of the deenergized circuit is above a predetermined value and the deenergized circuit has not been reenergized from some other source at the instant the connection is established.

In accordance with our invention, we provide means for establishing, in response to the voltage of one of the circuits decreasing below a predetermined value, a relatively high impedance connection between the two circuits so that the current supplied to the deenergized circuit from the energized circuit produces a voltage across the deenergized circuit which varies with the load impedance connected to the deenergized circuit, and means responsive to the voltage across the deenergized circuit exceeding a predetermined value for interrupting the impedance connection between the two circuits and for effecting the direct connection of the two circuits if the voltage of the deenergized circuit is below a predetermined value after the impedance connection has been interrupted for a predetermined time interval.

Our invention will be better understood from the following description when taken in connection with the accompanying drawing, the single figure of which diagrammatically illustrates a circuit breaker control system embodying our invention, and the scope of our invention will be pointed out in the appended claims.

Referring to the drawing, 1 and 2 respectively represent two corresponding conductors of two independently energized direct current circuits which are arranged to be connected directly together by a suitable circuit breaker 3. In order to simplify the disclosure, the ground is shown as being the other side of the two independently energized circuits, but it will be evident that our invention is equally applicable to an arrangement for interconnecting two ungrounded circuits.

The circuit comprising the conductor 1 and ground is shown as being energized by a source of current 4, and the circuit comprising the conductor 2 and ground, which is assumed to be a load or feeder circuit, is shown as being energized by a source of current 5 through a circuit breaker 5'. In the particular embodiment of our invention shown in the drawing, the circuit breaker 3 is normally open and is arranged to be closed in response to the circuit including the conductor 2 becoming deenergized. This result is accomplished by means of a voltage relay 6 which is connected between the conductor 2 and ground and which is arranged to close its contacts 7 when the voltage between the conductor 2 and ground is below a predetermined value. The closing of the contacts 7 effects the energization of an auxiliary relay 8, which in turn effects the energization of another auxiliary relay 9. When energized, the relay 9 effects the deenergization of the auxiliary relay 8 which, after being deenergized for a predetermined time interval, returns to its normal position. The closing of the contacts 7 of the voltage relay 6 also effects the energization of another auxiliary relay 10, which when energized opens its contacts 11, which are in the energizing circuit of the closing coil of the circuit breaker 3, and also closes its contacts 12 which are connected in parallel with the contacts 7 of the voltage relay 6.

When the relay 9 is energized and the relay 8 is in its deenergized position, a circuit is completed for a control relay 13, which when energized establishes an impedance connection between the conductors 1 and 2. This impedance connection includes a suitable impedance such as a resistor 14 having a high resistance value relative to the normal load resistance between the conductor 2 and ground. The energization of the auxiliary relay 9 also connects the operating winding 15 of a suitable load impedance responsive relay 16 between the conductor 2 and ground, and the polarizing winding 17 of the load impedance responsive relay 16 is connected between the conductor 1 and ground when the auxiliary relay 9 is energized and the auxiliary relay 8 is in its deenergized position. As shown, the load impedance responsive relay 16 is of a type well known in the art and is arranged to close its contacts 18 when the voltage between the conductor 2 and ground is above a predetermined value. The closing of the contacts 18 effects the energization of an auxiliary relay 19, which in turn effects the deenergization of the control relay 13 to interrupt the circuit through the resistor 14 and effects the deenergization of the time delay drop-out auxiliary relay 10.

If when the auxiliary relay 10 is restored to its normal position and its contacts 12 are opened and its contacts 11 are closed the voltage between the conductor 2 and ground is below a predetermined value so that the contacts 7 of the voltage relay 6 are closed, thereby indicating that the circuit including the conductor 2 and ground is not being energized by some other source, a circuit is completed for the closing coil of the circuit breaker 3 to connect the conductors 1 and 2 directly together.

The operation of the arrangement shown in the drawing is as follows: Under normal operating conditions when both of the circuits are independently energized, the circuit breaker 3 is open and the voltage relay 6 is energized so that its contacts 7 are open. The other control relays shown in the drawing are deenergized and occupy the positions in which they are shown.

When the source 5 is disconnected from the circuit including the conductor 2 and ground by the circuit breaker 5′ being opened, the voltage relay 6 becomes deenergized and closes its contacts 7 to complete an energizing circuit for the auxiliary relay 19 from the conductor 1 to ground through the auxiliary contacts 21 of the circuit breaker 3 and the contacts 31 of the auxiliary relay 19 to ground. The closing of the contact 12 of the relay 19 completes a shunt circuit around the contacts 7 of the relay 6. The closing of the contacts 7 also completes an energizing circuit for the auxiliary relay 8 from the conductor 1 to ground through the auxiliary contacts 21 of the circuit breaker 3, the winding of auxiliary relay 8 and the contacts 22 of auxiliary relay 9. The closing of the contacts 23 of the auxiliary relay 8 completes between the conductor 1 and ground an energizing circuit for the winding of auxiliary relay 9 through the contacts 21 of the circuit breaker 3, the contacts 7 of the voltage relay 6 and the contacts 12 of the relay 10 in parallel, and the contacts 32 of the circuit breaker 3. The closing of the contacts 24 of the relay 9 completes a shunt circuit around the contacts 23 of the relay 8 in the energizing circuit of the relay 9. The opening of the contacts 22 of the relay 9 interrupts the heretofore described energizing circuit of the auxiliary relay 8. After being deenergized for a predetermined time, the relay 8 opens its contacts 23 and closes its contacts 25 to complete between the conductor 1 and ground an energizing circuit for the polarizing winding 17 of the load impedance responsive relay 16 through the contacts 21 of the circuit breaker 3, the contacts 7 of the voltage relay 6 and the contacts 12 of the relay 10 in parallel, and the contacts 26 of the relay 9. The operating winding 15 of the load impedance responsive relay 16 is connected between the conductor 2 and ground by the closing of the contacts 27 of the auxiliary relay 9.

The closing of the contacts 25 of the auxiliary relay 8 also connects the control relay 13 between the conductor 1 and ground. This circuit also includes the contacts 21 of the circuit breaker 3, the contacts 7 of the voltage relay 6 and the contacts 12 of the relay 10 in parallel, the contacts 26 of the auxiliary relay 9 and the contacts 30 of the auxiliary relay 19.

If the load resistance connected between the conductor 2 and ground exceeds a predetermined value, the voltage impressed across the operating winding 17 of the relay 16 is sufficient to cause the relay to close its contacts 18 and complete an energizing circuit for the auxiliary relay 19 between the conductor 1 and ground. This circuit also includes the contacts 21 of the circuit breaker 3, the contacts 7 of the voltage relay 6 and the contacts 12 of the relay 10 in parallel, the contacts 25 of the relay 8 and the contacts 26 of the relay 9. The closing of the contacts 33 of the relay 19 completes a shunt circuit around the contacts 18 of the relay 16. The opening of the contacts 30 of the relay 19 interrupts the heretofore described energizing circuit of the control relay 13 so that this relay becomes deenergized and interrupts the impedance circuit between the conductors 1 and 2 which includes the resistor 14. The opening of the contacts 31 of the relay 19 interrupts the heretofore described energizing circuit of the auxiliary relay 10. After being deenergized for a predetermined length of time, the auxiliary relay 10 opens its contacts 12 and closes its contacts 11. If at the instant the contacts 12 are opened and the contacts 11 are closed the voltage between the conductor 2 and ground is below a predetermined value so that the contacts 7 of the voltage relay 6 are closed, an energizing circuit is completed for the closing coil of the circuit breaker 3. This circuit is from the conductor 1 through the contacts 21 of the circuit breaker 3, the contacts 7 of the voltage relay 6, the contacts 25 of the relay 8, the contacts 26 of the relay 9, the contacts 34 of the relay 19, the contacts 11 of the relay 10, and the closing coil of circuit breaker 3 to ground. The closing of the main contacts of the circuit breaker 3 connects the conductors 1 and 2 directly together, and the closing of the auxiliary contacts 35 of the circuit breaker 3 completes a locking circuit for the closing coil of the circuit breaker 3 through the contacts 36 of a suitable control device which may be operated in any desired manner to effect the deenergization of the closing coil. The opening of the auxiliary contacts 21 of the circuit breaker 3 interrupts the heretofore described circuits for the auxiliary relays 9 and 19 so that these relays become deenergized and restore the control apparatus to its normal position.

If at the instant when the contacts 12 of the relay 10 are opened the voltage between the conductor 2 and ground is at its normal value due to this circuit being independently energized, the heretofore described energizing circuit for the closing coil of the circuit breaker 3 is not completed to connect the conductors 1 and 2 directly together because the contacts 7 of the voltage relay 6 are then open.

While we have disclosed our invention in connection with an arrangement for reclosing a circuit breaker in response to the load connected to the circuit on one side of the breaker, it is obvious that it is equally applicable to reclosing arrangements of the type shown in Letters Patent 1,676,314, 1,676,315 and 1,676,316 in which the circuit breaker is arranged to be reclosed in response to load connected to either of the two circuits connected together by the circuit breaker.

While we have, in accordance with the patent statutes, shown and described our invention as applied to a particular system and as embodying various devices diagrammatically indicated, changes and modifications will be obvious to those skilled in the art, and we therefore aim in the appended claims to cover all such changes and modifications as fall within the true spirit and scope of our invention.

What we claim as new and desire to secure by Letters Patent of the United States is:

1. An arrangement for automatically closing a switch between two normally energized circuits when one of said circuits becomes deenergized comprising means responsive to the deenergization of said one of said circuits for establishing between said circuits an arrangement for measuring the load impedance connected to the deenergized circuit, means controlled by said load impedance measuring arrangement for rendering said load impedance measuring arrangement inoperative when the load impedance exceeds a predetermined value, and means dependent upon said one of said circuits being deenergized at the expiration of a predetermined time interval after said load impedance measuring arrangement is rendered inoperative for effecting the closing of said switch.

2. An arrangement for automatically closing a switch between two electric circuits when a predetermined one of said circuits is energized and the voltage of the other circuit decreases below a predetermined value comprising means responsive to the voltage of said other circuit decreasing below said predetermined value for establishing an impedance connection between said circuits, means dependent upon the voltage across said other circuit exceeding a predetermined value while said impedance connection is established for effecting the opening of said impedance connection, and means dependent upon the voltage of said other circuit being below a predetermined value at the expiration of a predetermined time interval after said impedance connection is opened for effecting the closing of said switch.

3. An arrangement for automatically closing a switch between two electric circuits when a predetermined one of said circuits is energized and the voltage of the other circuit decreases below a predetermined value, a resistor, means responsive to the voltage of said other circuit decreasing below a predetermined value for connecting said resistor between said circuits, means responsive to the voltage of said other circuit exceeding a predetermined value while said resistor is connected between said circuits for interrupting the connection between said circuits through said resistor, and means responsive to the voltage of said other circuit being below a predetermined value at the expiration of a predetermined time interval after said connection is interrupted for effecting the closing of said switch.

4. An arrangement for automatically closing a switch between two electric circuits when a predetermined one of said circuits is energized and the voltage of the other circuit decreases below a predetermined value, a resistor, means responsive to the voltage of said other circuit decreasing below a predetermined value for effecting the connection of said resistor between said circuits after a predetermined time interval, timing means, means responsive to the voltage of said other circuit exceeding a predetermined value while said resistor is connected between said circuits for effecting the interruption of the connection through said resistor and for initiating the operation of said timing means, and means controlled by said timing means and the voltage of said other circuit for effecting the closing of said switch if the voltage of said other circuit is below a predetermined value at the expiration of the timing operation of said timing means.

5. An arrangement for automatically closing a switch between two electric circuits when a predetermined one of said circuits is energized and the voltage of the other circuit decreases below a predetermined value, a resistor, a voltage relay, means responsive to the voltage of said other circuit decreasing below a predetermined value for effecting after a predetermined time interval the connection of said resistor between said circuits and the connection of said voltage relay across said other circuit, timing means, means controlled by said voltage relay for effecting the operation of said timing means and for interrupting the connection through said resistor and the connection of said voltage relay when the voltage of said other circuit exceeds a predetermined value, and means controlled by said timing means and the voltage of said other circuit for effecting the closing of said switch if said voltage is below a predetermined value at the expiration of the timing operation of said timing means.

6. An arrangement for automatically closing a circuit breaker between two electric circuits comprising means for measuring the load impedance of one of said circuits when the circuit breaker is open, means for rendering said measuring means inoperative when the load impedance measured thereby exceeds a predetermined value, and means dependent upon a predetermined voltage condition of said one of said circuits subsequent to said measuring means being rendered inoperative for closing said circuit breaker.

7. An arrangement for automatically closing a circuit breaker between two electric circuits comprising means for measuring the load impedance of one of said circuits when the circuit breaker is open, means for rendering said measuring means inoperative when the load impedance measured thereby exceeds a predetermined value, and means dependent upon the voltage of said one of said circuits being below a predetermined value subsequent to said measuring means being rendered inoperative for closing said circuit breaker.

HERMAN BANY.
AMOS W. BATEMAN.